United States Patent
Vuillerme et al.

(10) Patent No.: US 10,533,775 B2
(45) Date of Patent: Jan. 14, 2020

(54) SOLAR ABSORBER BODY FOR A CONCENTRATING SOLAR POWER SYSTEM AND A METHOD FOR MANUFACTURING A SOLAR ABSORBER BODY

(71) Applicants: COMMISSARIAT À L'ENERGIE ATOMIQUE ET AUX ENERGIES ALTERNATIVES, Paris (FR); SALZGITTER MANNESMANN PRECISION ETIRAGE SAS, St-Florentin (FR)

(72) Inventors: Valéry Vuillerme, Viviers-du-Lac (FR); Arnaud Bruch, Grenoble (FR); Gatien Fleury, Gréoux-les-Bains (FR); Benoit Boulay, Neuvy Sautour (FR); Jean-Marc Duhamel, Vitry-le-François (FR)

(73) Assignees: COMMISSARIAT À L'ENERGIE ATOMIQUE ET AUX ENERGIES ALTERNATIVES, Paris (FR); SALZGITTER MANNESMANN PRECISION ETIRAGE SAS, St-Florentin (FR)

( * ) Notice: Subject to any disclaimer, the term of this patent is extended or adjusted under 35 U.S.C. 154(b) by 656 days.

(21) Appl. No.: 14/905,604

(22) PCT Filed: Jul. 18, 2014

(86) PCT No.: PCT/EP2014/065568
§ 371 (c)(1),
(2) Date: Jan. 15, 2016

(87) PCT Pub. No.: WO2015/007908
PCT Pub. Date: Jan. 22, 2015

(65) Prior Publication Data
US 2016/0153682 A1    Jun. 2, 2016

(30) Foreign Application Priority Data

Jul. 19, 2013 (EP) .................................... 13354028

(51) Int. Cl.
*F24S 10/75* (2018.01)
*F24S 60/00* (2018.01)

(52) U.S. Cl.
CPC ............... *F24S 10/75* (2018.05); *F24S 60/00* (2018.05)

(58) Field of Classification Search
CPC .......... F28F 1/40; F28F 1/42; F28F 2001/428; F24J 2002/261; F24S 23/74; Y02E 10/45
(Continued)

(56) References Cited

FOREIGN PATENT DOCUMENTS

| CN | 101806507 A | 8/2010 |
|----|-------------|--------|
| DE | 2800439 A1  | 7/1979 |

(Continued)

OTHER PUBLICATIONS

DE 102004059092 A1—English machine translation.*
Sep. 3, 2014 Search Report issued in International Patent Application No. PCT/EP2014/065568.

*Primary Examiner* — Jorge A Pereiro
(74) *Attorney, Agent, or Firm* — Oliff PLC (57) ABSTRACT

A solar absorber body for a concentrating solar power system, said solar absorber body including: a tube, designed to contain a heat transfer medium and including a first part designed to be exposed to the sunlight and a second part designed to be unexposed to the sunlight, an assembly of fins made of thermally conductive material, and a selective coating arranged at least on the outer surface of the first part of the tube, said assembly of fins defining at least two longitudinal passages inside the tube, said passages being adjacent in a sectional plane perpendicular to the longitudinal axis of the tube, said assembly of fins being configured (Continued)

to create a continuous thermal bridge inside the tube from at least a portion of the inner surface of first part of the tube to at least a portion of the inner surface of the second part of the tube.

20 Claims, 5 Drawing Sheets

(58) Field of Classification Search
USPC .......................................................... 126/671
See application file for complete search history.

(56) References Cited

FOREIGN PATENT DOCUMENTS

| DE | 102004059092 A1 | * | 6/2006 | ............. B21B 21/00 |
|----|----|----|----|----|
| JP | S51-35141 A | | 3/1976 | |
| JP | S53-41836 A | | 4/1978 | |
| WO | 2011/055401 A2 | | 5/2011 | |
| WO | 2012/110341 A1 | | 8/2012 | |
| WO | 2012/168577 A2 | | 12/2012 | |

* cited by examiner

SOLAR ABSORBER BODY FOR A CONCENTRATING SOLAR POWER SYSTEM AND A METHOD FOR MANUFACTURING A SOLAR ABSORBER BODY

TECHNICAL FIELD OF THE INVENTION

The invention relates to a solar absorber body for a concentrating solar power system comprising a tube, designed to contain a heat transfer medium, and comprising an assembly of fins made of thermally conductive material.

The invention also relates to a method for manufacturing a solar absorber body said method comprising the steps of:
- providing a tube designed to contain a heat transfer medium,
- inserting into the tube an assembly of fins made of thermally conductive material,
- cold-drawing the tube and the assembly of fins in a single operation, so as to crimp the assembly of fins into the tube.

BACKGROUND ART

Concentrating solar power systems are designed to collect heat by absorbing sunlight. Classically, sunlight is concentrated and focused onto a solar absorber body containing a heat transfer fluid (steam, oil or other heat transfer medium). The solar absorber body can be, for example an elongated absorber tube through the interior of which flows the heat transfer fluid. The solar absorber body absorbs the sunlight and convert it into heat. Then heat is transmitted to the heat transfer fluid. The temperature of the fluid then strongly increases.

The heat transfer fluid can be used in a standard turbine generator for electricity generation. For example, parabolic troughs, Fresnel reflectors and solar power towers can be used to convert the sunlight into thermal electric power. Generally, the solar absorber body contains a substrate, usually an elongated tube, covered by a selective coating comprising an infrared reflective layer, a solar absorption layer and most often an antireflective layer.

The selective coating must present specific optical properties such as a high solar absorption and a low thermal emissivity. Moreover, the selective coating must be thermally stable without impairing the reflective and absorbing properties. The lifetime of the selective coating depends, among others, on the working atmosphere, the maximal operating temperature and on the variation of temperatures at the outer surface of the tube.

The tube of the solar absorber body is subjected to irradiation only on a semi-cylindrical surface, i.e. where the sunlight is focused. Therefore, the tube is subjected to large circumferential heat flux variations on its outer surface inducing circumferential thermal gradient on the outer surface of the tube. These thermal gradients induce on one hand thermo-mechanical stresses and on the other hand area of higher temperature, which accelerate the deterioration of the selective coating.

Figure 1:
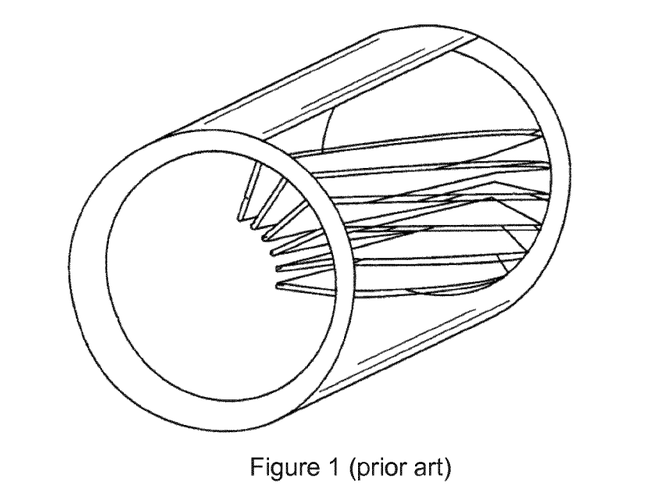
FIG. 1 represents a three-dimensional view of a solar absorber body, according to prior art.

As represented in FIG. 1, to reduce the circumferentially thermal gradient, international application WO2011/055401 proposes to introduce protruding elements on the irradiated portion of the tube, on the inner surface of the tube, to increase the turbulence of the fluid and therefore the exchanged thermal energy. These elements can be fins, all with radial extension on the side of the tube where the sunlight is focused.

The presence of fins in a portion of the solar tube allows to locally lower the thermal circumferential gradients. A parametric analysis has been conducted as a function of the fins height, the number of fins, the angle disposition of the fins in the tube and the temperature of the heat transfer medium for a level of convective heat transfer coefficient of 520 W/m²·K, which is close to those obtained for thermodynamic solar power applications using gas as heat-carrying fluid. For instance, the maximum temperature passes from 370° C. in absence of fins down to 323° C. using 24 fins 5 mm long and 2 mm thick distributed over an arc of 150° in the inner surface of the tube. The presence of fins reduces deformation of the section of the tube by 10%.

However, the section of the obtained tube is not axisymmetric and therefore requires particular and complicated processes of elaboration.

International application WO2012/110341 describes a solar tube, the inner face of the tube being provided with helical ribs. Nevertheless, the thermal circumferential gradient reduction with such a structuration would be negligible for solar applications involving heat transfer temperature reaching 500° C.

OBJECT OF THE INVENTION

One object of the invention is to remedy the shortcomings of the prior art and, in particular, to provide a solar absorber body with a long-lasting service life by reducing the circumferential thermal gradient and the maximal operating temperature.

It is a further object of the invention to propose a method for manufacturing a solar absorber body that contains element to reduce the gradient temperature at the surface of the tube and that is easy to implement with substantially low costs.

It is another object to provide a concentrating solar power system comprising such a solar absorber body.

According to the invention, these objects are achieved by a solar absorber body for a concentrating solar power system and a method for manufacturing a solar absorber body according to the indexed claims.

BRIEF DESCRIPTION OF THE DRAWINGS

Other advantages and features will become more clearly apparent from the following description of particular embodiments of the invention given for non-restrictive example purposes only and represented in the appended drawings, in which.

The coating thickness of each layer is shown much greater than it actually is in order to simplify the illustrations.

The drawings are not necessarily to scale.

DESCRIPTION OF PARTICULAR EMBODIMENTS OF THE INVENTION

Figure 2:
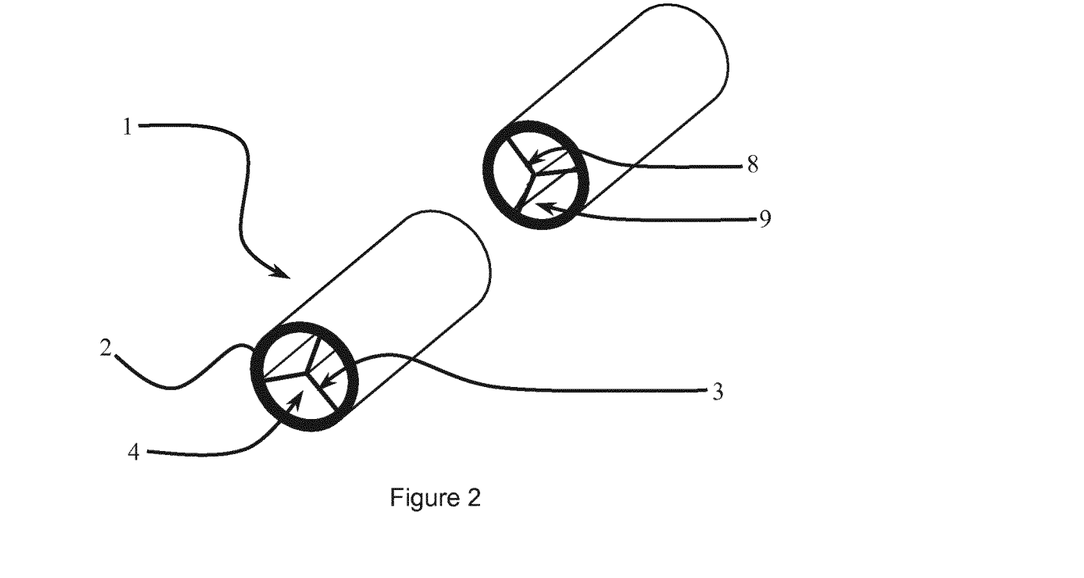
FIG. 2 represents a three-dimensional view of a solar absorber body, according to one embodiment of the invention.

As represented in FIG. 2, the solar absorber body 1 for a concentrating solar power system comprises:

- a tube 2, designed to contain a heat transfer medium 10 and comprising a first part designed to be exposed to the sunlight and a second part designed to be unexposed to the sunlight,
- an assembly of fins 3 made of thermally conductive material,
- and a selective coating arranged at least on the outer surface of the first part of the tube 2.

The assembly of fins 3 is configured to define at least two longitudinal passages 4 inside the tube for the heat transfer medium, said passages 4 being adjacent in a sectional plane perpendicular to the longitudinal axis of the tube.

The assembly of fins 3 is configured to create a continuous thermal bridge inside the tube from at least a portion of the inner surface of first part of the tube to at least a portion of the inner surface of the second part of the tube.

By a first part designed to be exposed to the sunlight it should be understood the part of the tube where the sunlight is concentrated. The other part corresponds to the second part designed to be unexposed to the sunlight, this is the part of the tube where the sunlight is not concentrated, each part being complementary of each other. Preferentially, the part designed to be exposed to the sunlight and the part designed to be unexposed to the sunlight are opposite each other on the diameter of the tube.

For example, each part can have semi-cylindrical shape.

In a preferred embodiment, the tube 2 has a nominal diameter (DN) ranging preferably from DN15 to DN80 and a wall thickness ranging from sch 40 to sch 160 according to the nominal pipe sizes. Other sizes could be possible. Preferentially, the tube is configured to contain a heat transfer medium such as oil, water or water vapour, or any other heat transfer fluid.

The thickness of the tube 2 is preferably between 1.25 mm and 6.35 mm depending on the operating pressure and temperature.

According to a more preferred embodiment, the tube 2 has a nominal diameter of DN40, i.e. an outside diameter of 48.26 mm, and a wall thickness of sch 80, which corresponds to a wall thickness of 5,080 mm.

The tube 2 can be a seamless or a welded tube, cold drawn or not. Advantageously, the tube 2 is a seamless cold drawn tube.

Furthermore, advantageously the tube 2 is a cold drawn seamless tube to get tight tolerances, excellent surface properties, excellent mechanical properties at high temperature and in particular under pressure. The preferred target range of temperature is 150° C.-650° C., and more particularly between 300° C. and 600° C., the pressure range is, advantageously, 2 bar-200 bar, and more particularly between 50 bar and 200 bar.

The tube 2 may be made of an iron, nickel or titanium alloy, the principal alloying elements, in terms of percentage per weight, of these alloys being iron, nickel or titanium respectively.

Iron alloys present, advantageously, the best compromise between cost and thermomechanical performance.

Nickel alloys have a better mechanical strength and can be used at higher temperatures.

Titanium alloys are, advantageously, lighter and enable to reduce the weight of the whole structure.

More preferentially, the tube 2 is made of iron alloy.

In particular, the tube 2 is a steel tube. The tube 2 may be a stainless steel tube. The tube 2 is preferably a low alloy steel tube or a high alloy steel tube. These grades of steel contain less than 12.5% by weight of chromium, and preferably less than 10.5% by weight of chromium. These steels are different from stainless steels, which usually contain more than 12.5% by weight of chromium. These steels usually have better mechanical properties, for example higher Young's Modulus, and are cheaper especially because they do not contain any nickel. Nevertheless, they do not form thin passive layer mainly constituted of $Cr_2O_3$, $Al_2O_3$, $SiO_2$ or MgO as the usual stainless steels do. Low alloy steel constitutes a category of ferrous materials that exhibit relevant mechanical properties as the result of additions of alloying elements such as carbon, chromium, manganese and molybdenum. Total alloying elements can range up to 8% by weight. For example, P195GH, 13CrMo44 and 10CrMo9-10 are low alloy steel. They can be used up to temperatures between 350° C. and 550° C. under relatively harsh pressure conditions. By harsh pressure conditions, we understood a pressure between 50 bar and 200 bar.

High alloy steels contain more alloying elements than the low alloy steel, the chromium content remaining less than 12.5% by weight. They can be used for temperature up to 650° C. while keeping a reasonable creep resistance. X10CrMoVNb9-1 and X11CrMoWVNb97 are, for instance, high alloy steels. These alloy steels are advantageously cheaper than stainless steels, especially those that contain nickel as alloying elements such as AISI 304 or 316.

Advantageously, low alloy steel presents excellent thermal conductivity enhancing heat transfer from the substrate to the heat transfer medium. Preferably, the tube is a low-alloy steel tube, in particular made of 10CrMo9-10, which presents a good thermal conductivity, low coefficient of thermal expansion (for example, in the range 10-15 ppm/K between 20 and 550° C.), low cost and good resistance to creep deformation.

Preferably, the tube 2 is made of iron, nickel, or titanium alloy, or steel, such as P195GH, 13CrMo44, 10CrMo9-10, X10CrMoVNb9-1 and X11CrMoWVNb97.

The solar absorber body comprises an assembly of fins 3 defining at least two longitudinal passages 4 inside the tube for the heat transfer medium.

In order to obtain at least two longitudinal passages 4 in the tube 2, said longitudinal passages 4 being adjacent in a sectional plane perpendicular to the longitudinal axis of the tube, the assembly of fins 3 comprises at least one fin. The longitudinal passages 4 can also be called channels.

Figure 3:
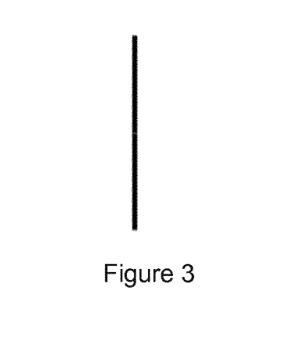
FIGS. 3 to 14 represent cross-sectional views of an assembly of fins according to different particular embodiments of the invention.
Figure 4:
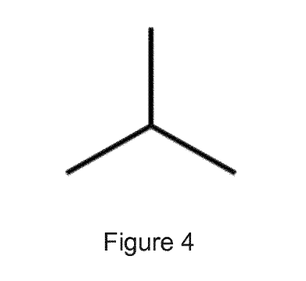
Figure 5:
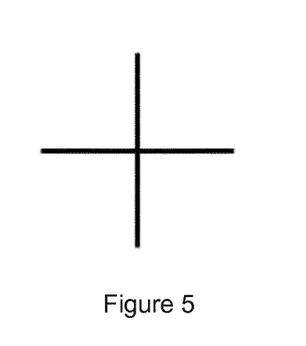
Figure 6:
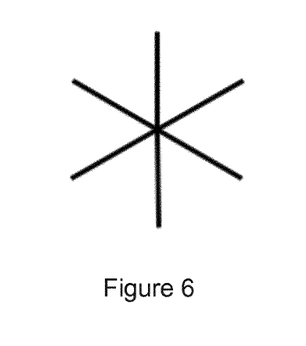
Figure 7:
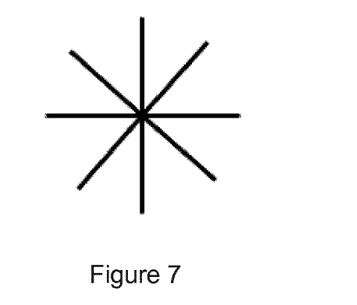
Figure 8:
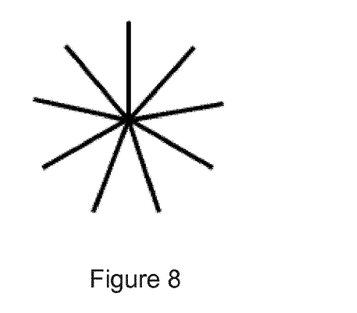

Preferentially, the assembly of fins 3 comprises at least two fins. The shape of a 2-fins assembly, in a cross-sectional view, can be a straight line as represented in FIG. 3 or it could have a L-shape for example.

The fins extend in a path such that they provide a plurality of crossing channels for the heat transfer medium flowing in the tube.

The assembly of fins 3 is configured so as to create a continuous thermal bridge inside the tube from at least a portion of the inner surface of first part of the tube to at least a portion of the inner surface of the second part of the tube. The thermal bridge could also be called thermal connexion.

By continuous thermal bridge it should be understood an element creating a continuous thermal path, made of a material having a good thermal conductivity, between the face of the tube designed to be exposed to the sunlight to the other face. The continuous thermal bridge is disposed through the cross-sectional area of the tube and thermally connects the face of the tube designed to be exposed to the sunlight to the other face.

This increases heat conduction inside the tube, and through the thermal bridge, between the part or face of the tube designed to be exposed to the sunlight and the other part or face of the tube designed to be unexposed to the sunlight.

A thermal conductive material should be understood as a material having a thermal conductivity equal to or greater than 40 W/m·K and preferentially higher than 200 W/m·K.

The cross-sectional surfaces of the longitudinal passages are defined by the shape of the assemblies of fins. The number and cross-sectional shape of the fins may vary as well as the regular interval between each fin.

According to preferred embodiments and as represented in FIGS. 4 to 14, the assembly of fins 3 defines between 3 and 8 longitudinal passages in the tube, i.e. the assembly of fins comprises from 3 to 8 fins. It is thus possible to provide a tube comprising from 3 to 8 longitudinal passages.

Advantageously, the thickness of the fins is in the order of 1 mm.

An assembly of fins 3 with less than 3 fins seems to be not sufficient enough to significantly increase the internal heat transfer coefficient. Beyond 8 fins, the tube begins to be over-filled, which induces pressure drop.

The pressure drop is due to frictional forces as a fluid flows in a tube, said frictional forces being caused by the resistance to flow. The pressure drop is a decrease in the pressure inside a tube between one point to another point.

According to a preferred embodiment, the assembly of fins 3 has a star-shaped structure. The fins connect each other to the same point in the cross-section of the tube.

Figure 9:
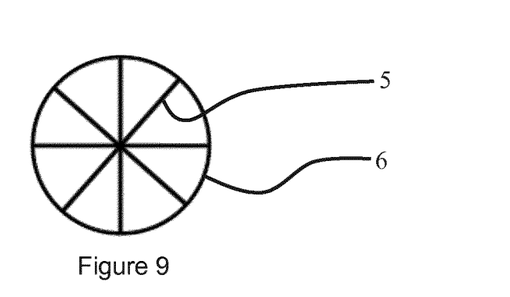
Figure 10:
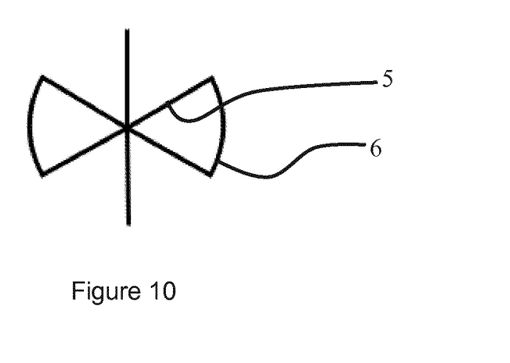
Figure 11:
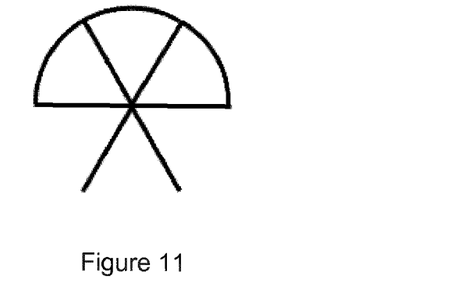

As represented in FIGS. 9, 10 and 11, the star-shaped structure features a core provided with arms, also called points 5, that radiates like spokes from a central axis. The core can correspond only to the intersection of the arms. Advantageously, such a form is actually easily inserted within a tube. Additionally, this form is likely to improve the exchange heat without increasing the pressure drop too much.

According to a particular embodiment, all the arms have the same dimension, which therefore correspond to the internal radius of the tube, the core being located in the centre of the cross-section of the tube.

As represented in FIGS. 9 to 13, the assembly of fins 3 can comprise an outer casing 6, said outer casing 6 being in contact with the inner part of the tube 2 and connecting at least two points 5 of the star-shaped structure. In an alternative embodiment and as represented in FIGS. 3 to 8, the assembly of fins is not provided with an outer casing.

Advantageously, an outer casing, which is discontinuous, i.e. which does not connect all the points of the star-shaped structure, enables the heat transfer medium flowing into the tube to be directly in contact with the inner diameter of the tube. This enables to decrease the contact resistance at the interface between the tube and the insert in the area where the flux is maximal.

Figure 12:
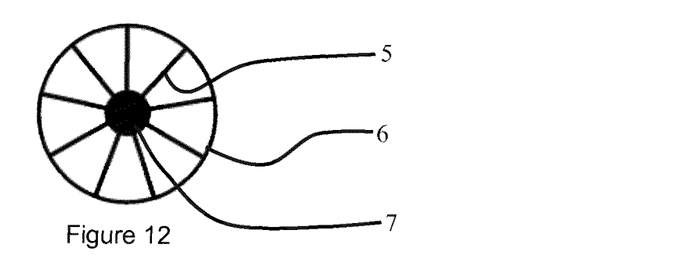
Figure 13:
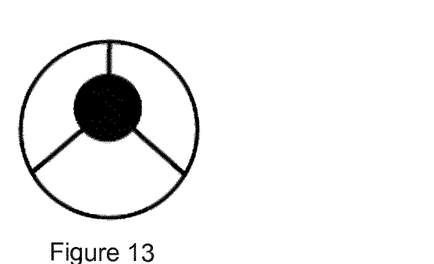

According to a particular embodiment and as represented in FIGS. 9, 12 and 13, the outer casing 6 is a ring, the outer casing having an outer diameter less than the inner diameter of the tube.

Advantageously, the outer casing enables to improve the retention of the insert into the tube. Such an insert could also be easier to manufacture, for example by an extrusion process.

Figure 14:
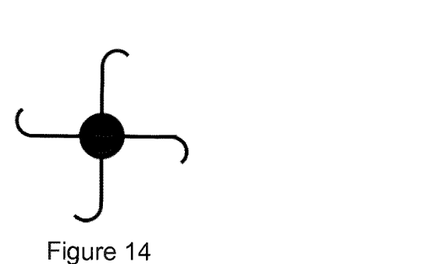

According to a particular embodiment and as represented in FIGS. 12 to 14, the assembly of fins comprises an obstructing element 7 located at the intersection of the points 5 of the star-shaped structure.

This assembly of fins 3 has therefore the shape of an elongated solid cylindrical body provided with angularly spaced radially extended ribs.

The presence of this obstructing element 7 leads to a section restriction of the tube, inducing locally the heat transfer medium acceleration.

According to a preferred embodiment, the obstructing element 7 represents at least 5% of the inner area of the tube, in a sectional plane perpendicular to the longitudinal axis of the tube.

Advantageously, it does not represent more than 20% of the inner area of the tube so as to not significantly increase the internal resistance of the heat transfer medium flowing inside the tube 2.

According to a particular embodiment and as represented in FIG. 13, the assembly of fins 3 is asymmetrical in a sectional plane perpendicular to the longitudinal axis of the tube 2.

Such a configuration increases locally heat transfer, but is nevertheless more difficult to fabricate.

According to a particular embodiment and as represented in FIGS. 3 to 12 and 14, the assembly of fins 3 is symmetrical in a sectional plane perpendicular to the longitudinal axis of the tube 2. The assembly of fins is coaxially inserted into the tube 2. Such an assembly of fins 3 is advantageously easy to implement. Additionally, the forces applied during the cold-drawing step onto this assembly of fins are equally distributed onto the fins.

According to a particular embodiment and as represented in FIG. 14, the part of the fins being in contact with the tube 2 may be flexible in order to absorb the expansion differential of the involved materials.

In a cross-sectional view and in a preferred embodiment, each longitudinal passage is delimited by at least two fins and the outer casing or the inner diameter of the tube.

According to a particular embodiment, as shown in FIG. 2, the tube 2 comprises at least an additional assembly of fins 8, the assembly of fins defining a first group of longitudinal passages 4 in the tube 2 and the additional assembly of fins 8 defining a second group of longitudinal passages 9 in the tube 2, the longitudinal passages 4 of the first group being shifted relative to the longitudinal passages 9 of the second group in the longitudinal axis of the tube 2.

This enables to mix the cold and hot fluid streams along the tube and to improve the reduction of the thermal gradient.

The geometry of the different assemblies of fins may be identical or different. The number of fins of the different assemblies could be different.

If the geometries of the fins are identical, the additional assembly of fins 8 can be shifted by a $\pi/n$ angle as compared to the first assembly of fins 4, with n being the number of fins. This aims firstly to periodically re-mix the fluid streams in order to homogenize the temperature of the fluid in the different longitudinal passages, and secondly to increase the heat transfer coefficients by increasing turbulence.

The assemblies of fins 3 and 8 may be arranged discontinuously along the tube. They can, for example, be disposed in the areas where the thermal gradient is the most critical and therefore where thermo-mechanical effects will be the most disadvantageous. They can also be disposed in areas where the temperature of the outer surface of the tube is the greatest and where therefore the risk of damage to the selective treatment is the most important. A suitable practice is then to use at least an assembly of fins along a section of a heat exchanger or any device containing a heat transfer medium with the purpose of exchanging heat between two media, the assembly of fins covering from 25% to 50% of the section of this device.

The application could be valid for any type of device, in which a heat exchange is performed, with circulating media.

According to a particular embodiment, the assembly of fins 3 is made of a material having a thermal conductivity equal to or greater than 40 W/m·K and preferably higher than 200 W/m·K.

Preferably, the assembly of fins 3 is made of aluminium alloy, steel or copper alloy.

The material of the assembly of fins is chosen for fabricability purpose and its compatibility with various heat transfer media with high temperature and pressure. Advantageously, such materials enable to provide low-cost assemblies of fins.

According to a particular embodiment, the tube and the fins are made of the same material. Advantageously, the fins and the tube are made of steel. Enhanced mechanical and thermal contacts between the fins and the tube are obtained. Advantageously, there is no differential thermal expansion. This enables to improve the lifetime of the tube 2 and/or assembly of fins 3.

Equalisation of the temperature between the face of the tube exposed to the sunlight and the other face is improved.

Advantageously, the assembly of fins 3 enables to homogenously mix the heat transfer medium in the tube. The temperature differential within said heat transfer medium is decreased.

The fins have a thickness comprises between 0.5 mm and 4 mm, depending especially of the diameter of the tube. For example, the thickness of the fins is 2 mm for tubes with a 38 mm of intern diameter.

Preferentially, the assembly of fins 3 is crimped into the tube 2.

According to a preferred embodiment, the assembly of fins 3 is cold drawn into the tube 2.

In order to determine the influence of the nature of the fins material and the number of fins on the thermal gradient, several simulations have been conducted.

The model used especially takes into account the increase of the internal heat transfer coefficient due to the change of the hydraulic diameter of the fluid streams.

The tube used for the simulation is a 10CrMo9-10 steel tube with DN50 and sch 80 characteristics, i.e. an external diameter of 60.33 mm and a thickness of 5,537 mm. The assembly of fins has a star-shaped structure, the thickness of the fins being 2 mm. The flux submitted to the tube has a concentration factor of 50; this concentration factor means that the energy radiated by the sun is concentrated 50 times on the absorber tube. The heat transfer fluid is steam and the flow rate inside the absorber is designed to avoid the destruction of the selective treatment.

With an assembly of 10CrMo9-10 steel fins ($\lambda$=40 W/m·K), the thermal gradient decreases by 7% with a 3-fins configuration and by 20% with a 8-fins configuration.

Figure 15:
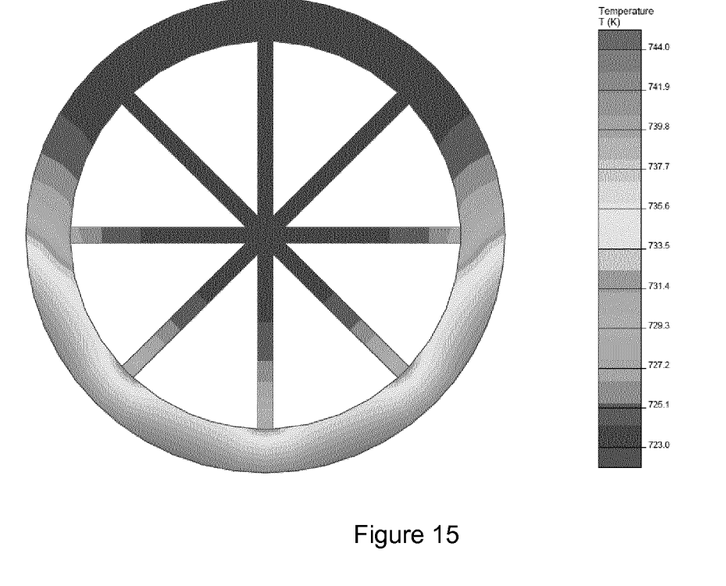
FIG. 15 represents a cross-sectional view of the temperature distribution over the circumferential section of the tubes and over the assembly of fins according to a particular embodiment of the invention.

With an assembly of aluminium fins ($\lambda$=200 W/m·K), the thermal gradient decreases by 28% with a 8-fins configuration, as shown in FIG. 15.

The results obtained for an assembly of copper fins ($\lambda$=300 W/m·K) present similar gains as compared to an assembly of aluminium fins.

The obtained simulated results are gathered in the following table. The temperature represents the maximum decrease in temperature according to the number of fins and for different materials:

| Number of fins/material | steel | aluminium | copper |
| --- | --- | --- | --- |
| 3 | −2° C. | −3° C. | −3° C. |
| 4 | −3° C. | −4° C. | −4° C. |
| 6 | −5° C. | −6° C. | −6° C. |
| 8 | −6° C. | −8° C. | −8° C. |

This decrease in temperature enables to prevent the deterioration of the selective coating and the tube, which increases their service life.

According to a preferred embodiment, a selective coating 11 can be arranged at least on the outer surface of the first part of the tube 2.

The selective coating 11 is designed to absorb a high percentage of incident solar light and emits a percentage of the energy absorbed as radiated heat. Preferentially, the target is to absorb more than 80% of the incoming solar light, whereas the emissivity should stay under 25% of the emissivity of a black body at the working temperature of the absorber.

The selective coating 11 is formed on at least the exposed part of the outer surface of the tube 2 and generally on all the outer surface of the tube 2. In a specific embodiment in which the selective coating is only arranged on the exposed part of the outer surface, the unexposed part of the tube can be nevertheless coated by at least a highly reflecting coating also called IR-mirror.

Figure 16:
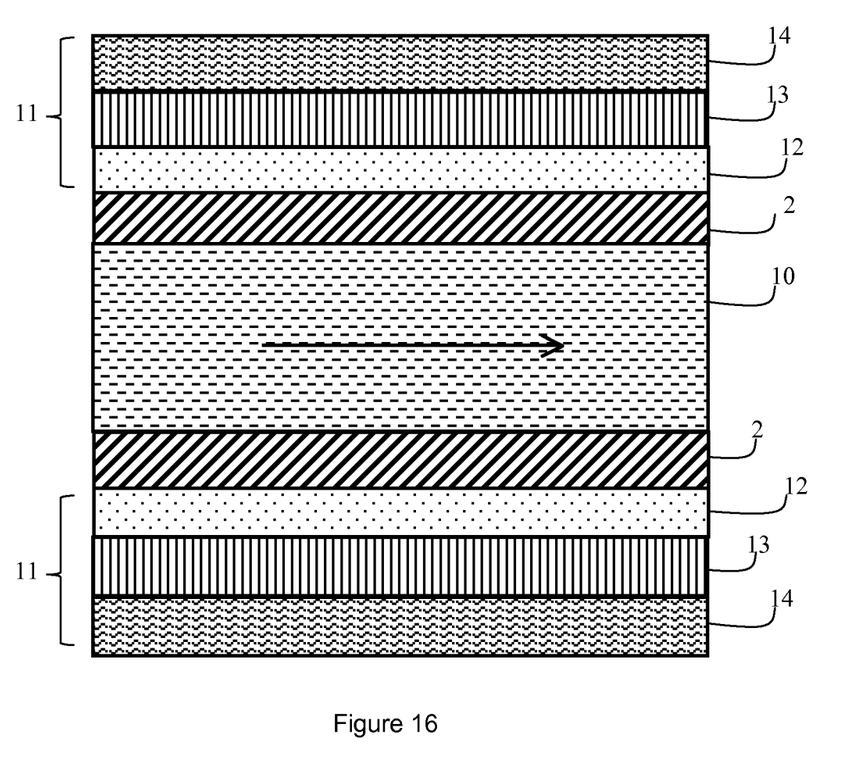
FIG. 16 represents a cross-sectional view of a tube overcoated by a selective coating, according to one embodiment of the invention.

As represented in FIG. 16, the selective coating 11 comprises of a stack arranged on the outer surface of the tube 2 (represented without the assembly of fins on the FIG. 16 for clarity purpose). The stack comprises several layers that produce the desired optical properties. Preferentially, the selective coating 11 is formed by a reflecting coating, a solar absorption layer 13 and possibly an anti-reflecting layer.

The highly reflecting coating is also called IR-mirror. Advantageously, the layer has a high solar absorption and a low IR-emissivity and the anti-reflecting layer improves the solar absorption.

The outer surface of the antireflective layer 14 can be textured to increase solar absorption and minimize surface reflection. Texturing can be applied by any suitable methods.

A stack comprising a platinum-based IR-mirror together with a cermet of $Cr/Cr_2O_3$, $Mo/Al_2O_3$ or $W/Al_2O_3$ with a $SiO_2$ antireflecting layer, or made from any other anti-reflecting materials, on top of it could for instance be used. Another option could be to use a selective painting containing high temperature resistant pigments, with or without the addition of a $SiO_2$ antireflecting layer.

In a specific embodiment, a diffusion barrier layer can be added to the selective coating, in particular when the tube is a steel tube chosen among P195GH, 13CrMo44, 10CrMo9-10 tubes. This diffusion barrier layer is in this case arranged to be in direct contact with the outer surface of the tube 2. The layers of the selective coating are separated from the tube 2 by the diffusion barrier layer 12. Advantageously, the diffusion barrier layer 12 reduces or prevents diffusion of any oxidizing species such as $O_2$ or its ions from the atmosphere to the tube 2, or on the contrary from atoms of the substrate 2 into the solar absorber layer and/or from the outer layer to the substrate 2. The diffusion barrier layer (12) can comprise at least a refractory material such as molybdenum, tungsten, $Al_2O_3$, $Cr_2O_3$, a nickel-chromium alloy, a cobalt-chromium alloy, WC, $ZrB_2$, or a mixture of $ZrB_2$ and SiC. The thickness of said diffusion barrier (12) layer is advantageously more than 25 µm and preferably comprises between 40 µm and 200 µm.

In another embodiment, the selective coating comprises at least one layer playing both a diffusion barrier role and an absorption layer role.

A method for manufacturing a solar absorber body 1 comprises the steps of:

providing a tube 2 designed to contain a heat transfer medium 10, with or without a selective coating, inserting into the tube 2 an assembly of fins made 3 of thermally conductive material, said assembly of fins 3 being designed to define at least two longitudinal passages 4 in the tube 2, said passages 4 being adjacent in a sectional plane perpendicular to the longitudinal axis of the tube, and said assembly of fins 4 being designed to create a continuous thermal bridge through the tube 2, cold-drawing the tube 2 and the assembly of fins 3, so as to crimp the assembly of fins 3 into the tube 2, forming the selective coating on at least on the outer surface of the first part of the tube 2.

The assembly of fins can be inserted automatically or semi-automatically into the tube.

The cold drawing operation ensures the crimping of the assembly of fins 3 into the tube 2. The tube 2 and the assembly of fins 3 form, advantageously, a single entity, a single body.

Advantageously, the cold drawing process enables to obtain a tube 2 with excellent straightness. Additionally, it is suitable for various diameters. It is an accurate and reproducible method. The obtained surface of the tube presents a low roughness and mechanical properties respectively adequate for optical and for mechanical requirement of the application.

Before inserting the assembly of fins 3 into the tube 2, a surface passivating operation may be carried out onto the assembly of fins 3 and/or the tube 2 to prevent corrosion.

After the cold-drawing step, the method for manufacturing the solar absorber body 1 also comprises the steps of depositing the selective coating 11 onto the tube 2. In a first step, the diffusion barrier layer 12 can be deposited on the outer surface of the tube 2 by thermal spraying.

Subsequently, the solar absorption layer 13 is deposited onto the diffusion barrier layer 12. The solar absorption layer 13 can be deposited by physical vapour deposition.

Preferably, the diffusion barrier layer 12 and the solar absorption layer 13 are deposited onto the tube after the cold-drawing step.

The obtained solar absorber body 1 has a high spectral absorption capacity over the solar wavelength range, i.e. the absorber body absorbs the incident solar radiation and convert it into another energy, i.e. heat, which is transferred by conduction to the adjacent layer. By high absorption capacity, we understood that the material absorbs between more than 80% of the incident solar radiation in the spectral range 300 nm<$\lambda$<1600 nm and by high yield of incident radiation, we understood that the thermal and optical losses in the solar absorber body are less than 25%. The losses can be quantified by spectrophotometry for example. This means that the solar absorption body 1 does only radiate back a small amount of heat and only loses a slight amount of incident solar radiation through reflection.

The invention is not limited to the embodiments described above for non-restrictive example purposes.

In particular, it can be applied to all tubes used as heat exchanger, said tubes containing a heat transfer medium, especially those involving an external source heterogeneously distributed around the tube.

The invention claimed is:

1. A solar absorber body for a concentrating solar power system, said solar absorber body comprising:

a tube, designed to contain a heat transfer medium and comprising a first part designed to be exposed to the sunlight and a second part designed to be unexposed to the sunlight, the tube having a nominal diameter between DN15 and DN80, the tube being made of a first material, an assembly of fins defining at least two longitudinal passages inside the tube, the at least two longitudinal passages being adjacent in a sectional plane perpendicular to a longitudinal axis of the tube, and a selective coating arranged at least on the outer surface of the first part of the tube, wherein the fins are made of the first material, aluminum alloy, or copper alloy and have a thickness between 0.5 mm and 4 mm configured to create a continuous thermal bridge inside the tube from at least a portion of the inner surface of the first part of the tube to at least a portion of the inner surface of the second part of the tube.

2. A solar absorber body according to claim 1, wherein the assembly of fins defines between 3 and 8 longitudinal passages in the tube.

3. A solar absorber body according to claim 2, wherein the assembly of fins has a star-shaped structure.

4. A solar absorber body according to claim 3, wherein the assembly of fins has an outer casing, said outer casing being in contact with an inner part of the tube and connecting at least two points of the star-shaped structure and wherein the outer casing is discontinuous so that an end of at least one fin of the assembly of fins is in contact with the tube and at least one longitudinal passage is delineated by the tube.

5. A solar absorber body according to claim 3, wherein the assembly of fins comprises an obstructing element located at an intersection of the fins and wherein the obstructing element represents at least 5% of an inner area of the tube and not more than 20% of the inner area of the tube.

6. A solar absorber body according to claim 5, wherein an inner face of the tube defines a circle in a cross-section plan and wherein the fins extend from the inner face of the tube to a connection point and the connection point is spaced from a center of the circle.

7. A solar absorber body according to claim 2, wherein the tube comprises at least an additional assembly of fins, the assembly of fins defining a first group of longitudinal passages in the tube and the additional assembly of fins defining a second group of longitudinal passages in the tube, the longitudinal passages of the first group being shifted relative to the longitudinal passages of the second group in the longitudinal axis of the tube and wherein the assembly of fins comprises an obstructing element located at an intersection of the fins and wherein the obstructing element represents at least 5% of an inner area of the tube and not more than 20% of the inner area of the tube.

8. A solar absorber body according to claim 1, wherein the assembly of fins is crimped into the tube.

9. A solar absorber body according to claim 1, wherein the tube is a seamless tube.

10. A solar absorber body according to claim 9, wherein the tube is a seamless cold drawn tube.

11. A solar absorber body according to claim 1, wherein the tube is made of comprising alloying elements and wherein an amount of the alloying elements ranges up to 8% by weight.

12. A solar absorber body according to claim 11, wherein the tube is made of P195GH, 13CrMo44, or 10CrMo9-10.

13. A solar absorber body according to claim 1, wherein the selective coating is formed by a reflecting coating made of a platinum-base IR mirror and a solar absorption layer made of a cermet of $Cr/Cr_2O_3$ or $Mo/Al_2O_3$.

14. A solar absorber body according to claim 1, wherein the selective coating is formed by a reflecting coating made of a platinum-base IR mirror, a solar absorption layer made of a cermet of $Cr/Cr_2O_3$ or $Mo/Al_2O_3$, and an anti-reflecting layer made of $SiO_2$.

15. A solar absorber body according to claim 1, said solar absorber body comprising a diffusion barrier layer in direct contact with the outer surface of the tube, the selective coating being separated from the tube by the diffusion barrier layer and wherein the diffusion barrier layer comprises at least a refractory material.

16. A solar absorber body according to claim 15, wherein the diffusion barrier layer comprises a refractory material selected from the group consisting of molybdenum, tungsten, $Al_2O_3$, $Cr_2O_3$, a nickel-chromium alloy, a cobalt-chromium alloy, WC, $ZrB_2$, and a mixture of $ZrB_2$ and SiC.

17. A method for manufacturing a solar absorber body according to claim 1 comprising the steps of:
providing the tube,
inserting into the tube the assembly of fins,
cold-drawing the tube and the assembly of fins, so as to crimp the assembly of fins into the tube,
forming the selective coating at least on the outer surface of the first part of the tube.

18. A method according to claim 17, wherein before inserting the assembly of fins into the tube, a pre-treatment operation is carried out onto the assembly of fins.

19. A solar absorber body according to claim 1, wherein the tube comprises at least an additional assembly of fins, the assembly of fins defining a first group of longitudinal passages in the tube and the additional assembly of fins defining a second group of longitudinal passages in the tube, the longitudinal passages of the first group being shifted relative to the longitudinal passages of the second group in the longitudinal axis of the tube and wherein the assembly of fins defines a first number of longitudinal passages and the additional assembly of fins defines a second number of longitudinal passages different from the first number.

20. A solar absorber body according to claim 1, wherein the first part is designed to be exposed to concentrated sunlight and the second part is designed to be unexposed to the concentrated sunlight.

* * * * *